(12) United States Patent
Wikstrand

(10) Patent No.: US 10,060,801 B2
(45) Date of Patent: Aug. 28, 2018

(54) TESTING DEVICE FOR WIRELESS POWER TRANSFER AND ASSOCIATED METHOD

(71) Applicant: nok9 AB, Malmo (SE)

(72) Inventor: Magnus Wikstrand, Limhamm (SE)

(73) Assignee: NOK9 AB, Malmö (SE)

( * ) Notice: Subject to any disclaimer, the term of this patent is extended or adjusted under 35 U.S.C. 154(b) by 0 days.

(21) Appl. No.: 15/650,585

(22) Filed: Jul. 14, 2017

(65) Prior Publication Data

US 2017/0314998 A1 Nov. 2, 2017

Related U.S. Application Data

(63) Continuation of application No. 15/077,114, filed on Mar. 22, 2016, now Pat. No. 9,739,668.

(30) Foreign Application Priority Data

Mar. 23, 2015 (SE) ...................................... 1550340

(51) Int. Cl.
*H02J 7/00* (2006.01)
*G01K 1/12* (2006.01)
(Continued)

(52) U.S. Cl.
CPC ............... *G01K 3/14* (2013.01); *G01K 1/026* (2013.01); *G01K 1/14* (2013.01); *H02J 7/0029* (2013.01);
(Continued)

(58) Field of Classification Search
CPC .. G01K 1/12; G01K 1/16; G01K 7/00; G01K 3/08; G01K 13/00; G01K 1/02;
(Continued)

(56) References Cited

U.S. PATENT DOCUMENTS

| 7,059,769 B1* | 6/2006 | Potega ................ B60L 11/1861 338/22 R |
| 2001/0044588 A1* | 11/2001 | Mault .................. A61B 5/0002 600/549 |

(Continued)

FOREIGN PATENT DOCUMENTS

CN 203588090 U * 5/2014

OTHER PUBLICATIONS

Title: Energy-saving automatic control system has mobile phone that is connected with signal processing host which is provided with data receiving and sensing module,data processing module wireless transceiver module. No author. No date.CN203588090U.*

*Primary Examiner* — Gail Kaplan Verbitsky
(74) *Attorney, Agent, or Firm* — Honigman Miller Schwartz and Cohn LLP

(57) ABSTRACT

A testing device is provided for use with a wireless power transmitter device having a wireless power transmitter coil. The testing device has a housing, the housing having a bottom side adapted for placement on a surface of the wireless power transmitter device, and a top side opposite to the bottom side. A wireless power receiver coil is provided in the housing. The testing device also has thermo sensory means and an interface to provide measurement data from the thermo sensory means. The thermo sensory means includes at least a first temperature sensor adapted to measure a temperature at a first position inside the housing, and a second temperature sensor adapted to measure a temperature at a second position external to the housing.

19 Claims, 7 Drawing Sheets

(51) Int. Cl.
*G01K 1/00* (2006.01)
*G01K 3/08* (2006.01)
*G01K 3/14* (2006.01)
*H02J 50/12* (2016.01)
*G01K 1/02* (2006.01)
*G01K 1/14* (2006.01)
*H02J 7/02* (2016.01)
*H02J 50/80* (2016.01)

(52) U.S. Cl.
CPC .............. *H02J 7/025* (2013.01); *H02J 50/12* (2016.02); *H02J 50/80* (2016.02)

(58) Field of Classification Search
CPC ............. G01K 1/024; G01K 2003/145; G01K 2213/00; G01K 2217/00; H02J 7/00
USPC ..................................................... 340/870.17
See application file for complete search history.

(56) References Cited

U.S. PATENT DOCUMENTS

| | | | | |
|---|---|---|---|---|
| 2006/0212768 A1* | 9/2006 | Ishida | ................ | G01R 31/3183 714/733 |
| 2008/0207198 A1* | 8/2008 | Juric | ...................... | H04B 17/23 455/425 |
| 2011/0273378 A1* | 11/2011 | Alameh | ............ | H04M 1/72569 345/173 |
| 2011/0310041 A1* | 12/2011 | Williams | ............ | G06F 11/3696 345/173 |
| 2012/0169139 A1* | 7/2012 | Kudo | ...................... | H02J 17/00 307/104 |
| 2012/0303887 A1* | 11/2012 | Radu | ....................... | G06F 13/28 711/113 |
| 2015/0340909 A1* | 11/2015 | Bell | ........................ | H02J 17/00 307/104 |
| 2016/0099614 A1* | 4/2016 | Leabman | ............... | H01Q 1/243 307/104 |
| 2016/0192213 A1* | 6/2016 | Diperna | ................ | H04B 17/11 455/425 |
| 2016/0285278 A1* | 9/2016 | Mehas | ..................... | H02J 50/12 |
| 2016/0302710 A1* | 10/2016 | Alberts | ................. | A61B 5/112 |
| 2016/0337053 A1* | 11/2016 | Diperna | ................ | H04B 17/11 |
| 2017/0077977 A1* | 3/2017 | Prendergast | ......... | H04B 1/3838 |
| 2017/0085134 A1* | 3/2017 | Jeong | ..................... | H02J 50/80 |
| 2017/0104460 A1* | 4/2017 | Keskin | .................... | H03F 3/181 |
| 2017/0207668 A1* | 7/2017 | Kanno | .................... | H02J 50/12 |
| 2017/0278375 A1* | 9/2017 | Galin | ................... | G08B 21/182 |

* cited by examiner

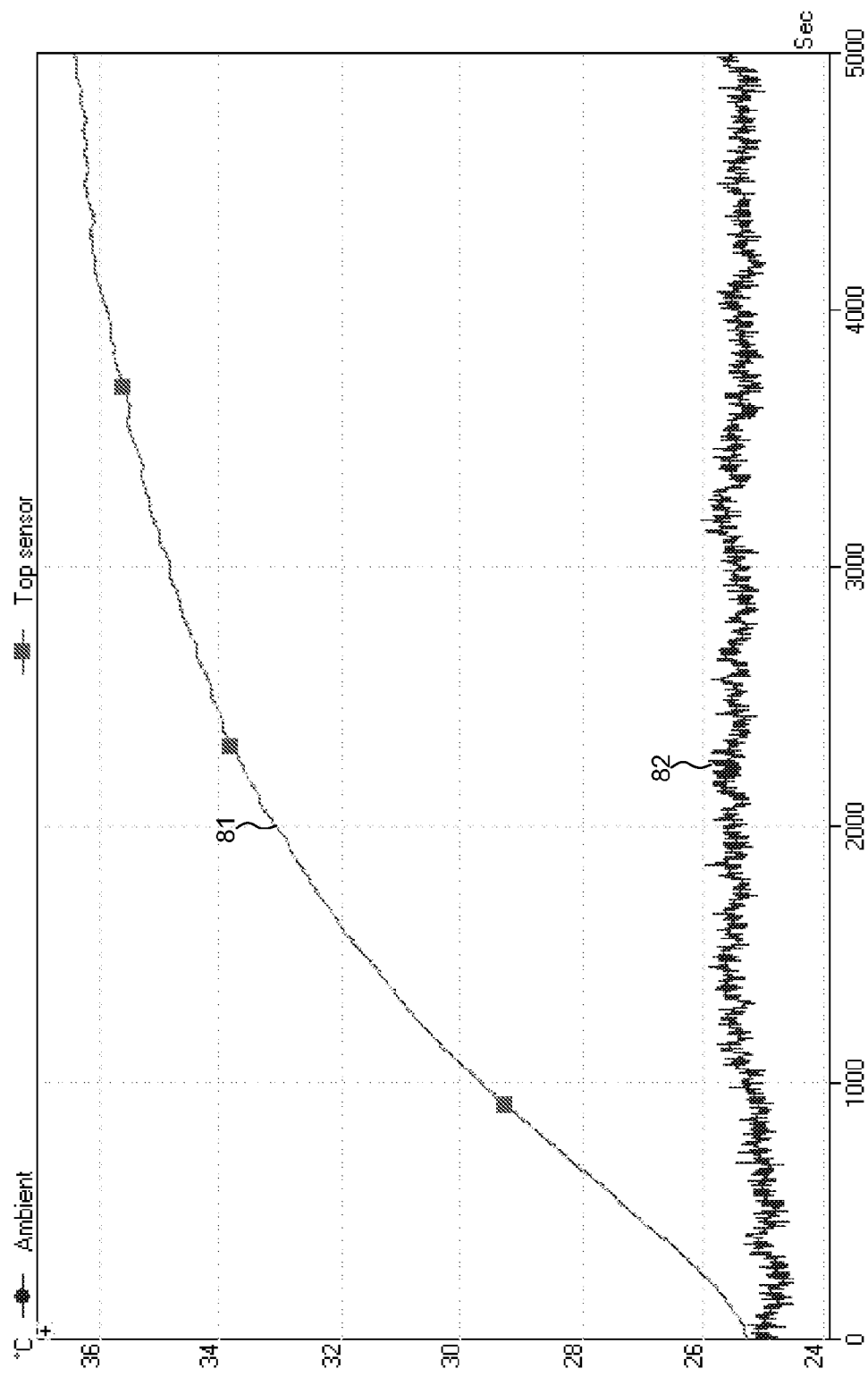

TESTING DEVICE FOR WIRELESS POWER TRANSFER AND ASSOCIATED METHOD

CROSS-REFERENCE TO RELATED APPLICATIONS

This application is a continuation of U.S. patent application Ser. No. 15/077,114, filed Mar. 22, 2016, which claims priority to Swedish Patent Application No. 1550340-2, filed Mar. 23, 2015, the entire contents of both being incorporated herein by reference.

TECHNICAL FIELD

The present invention generally relates to the field of wireless power transfer, and more specifically to wireless power transfer for mobile devices. Even more specifically, the present invention relates to a testing device for use with a wireless power transmitter device having a wireless power transmitter coil. The present invention also relates to a method of emulating the thermal exposure of a mobile device when being subjected to wireless power transfer from a wireless power transmitter device having a wireless power transmitter coil.

BACKGROUND

Wireless power transfer is expected to become increasingly popular, for instance for wireless battery charging of mobile devices such as, for instance, mobile terminals, tablet computers, laptop computers, cameras, audio players, rechargeable toothbrushes, wireless headsets, as well as various other consumer products and appliances.

The Wireless Power Consortium has developed a wireless power transfer standard known as Qi. Other known wireless power transfer approaches include Alliance for Wireless Power, and Power Matters Alliance.

The wireless power transfer standard known as Qi by the Wireless Power Consortium will be referred to, without limitation, throughout this document as the presently preferred wireless power transfer manner applicable to the present invention. However, the invention may generally be applied also to other wireless power transfer standards or approaches, including but not limited to the ones mentioned above.

Operation of devices that comply with Qi relies on magnetic induction between planar coils. Two kinds of devices are involved, namely devices that provide wireless power (referred to as base stations), and devices that consume wireless power (referred to as mobile devices). Power transfer takes place from a base station to a mobile device. For this purpose, a base station contains a subsystem (a power transmitter) that comprises a primary coil, whereas a mobile device contains a subsystem (a power receiver) that comprises a secondary coil. In operation, the primary coil and the secondary coil will constitute the two halves of a coreless resonant transformer.

Typically, a base station has a flat surface, on top of which a user can place one or more mobile devices so as to enjoy wireless battery charging or operational power supply for the mobile device(s) placed on the base station.

During operation, heat will be generated by magnetic induction in the secondary coil of the power receiver, i.e. in the mobile device. Moreover, the power transmitter in the base station will generate heat that will be conveyed from the base station to the mobile device. If the thermal exposure for the mobile device becomes excessive, several undesired effects may arise. For instance, vital components may be damaged in the mobile device, such as for instance a lithium ion battery or electronic circuitry in a smartphone. At severe overheating, objects in the vicinity of the mobile device may be damaged and even cause a fire or toxic smoke hazard. Furthermore, the duration of the charging period may be prolonged, since protective circuitry in the mobile device may intervene to reduce or even suspend the charging power until the temperature has been reduced again. Also, the intended user will become generally suspicious and assume a somewhat negative position with respect to the mobile device (or the base station) if the mobile device is too hot when picked up from the surface of the base station.

There is therefore a need among different interest groups to test, measure, evaluate, emulate or otherwise assess the thermal exposure of a mobile device when being subjected to wireless power transfer from a wireless power transmitter. Such interest groups may for instance involve any of the following: developers, manufacturers or suppliers of mobile devices; developers, manufacturers or suppliers of wireless power transmitter devices; test or compliance entities in the field of wireless power transfer; and test or compliance entities in the field of consumer product safety.

SUMMARY

It is an object of the invention to offer improvements in the technical field of wireless power transfer.

One aspect of the present invention is a testing device for use with a wireless power transmitter device having a wireless power transmitter coil. The testing device comprises a housing. The housing has a bottom side adapted for placement on a surface of the wireless power transmitter device, and a top side opposite to the bottom side.

The testing device also comprises a wireless power receiver coil provided in the housing, thermo sensory means, and an interface to provide measurement data from the thermo sensory means. The thermo sensory means comprises a first temperature sensor adapted to measure a temperature at a first position inside the housing. The thermo sensory means also comprises a second temperature sensor adapted to measure a temperature at a second position external to the housing.

Advantageously, the housing has a lower housing part comprising said bottom side, and an upper housing part comprising said top side. The upper housing part is preferably made of a material having heat dissipation properties similar to a typical mobile device, such as a smartphone, that the wireless power transmitter device is designed for use with. Hence, the upper housing part advantageously comprises at least one of aluminium and glass.

Preferably, the first temperature sensor is positioned in or at a socket which protrudes downwardly from an inner surface of the upper housing part. The socket may be an integral part of and made of the same material as the upper housing part. The socket preferably has a surface with an area dimensioned to match a horizontal extension of a surface of a ferrite layer for the wireless power receiver coil. This allows the socket to serve as a mount for the ferrite layer.

Advantageously, a heat transferring layer is provided between the surface of the socket and the surface of the ferrite layer. The heat transferring layer is preferably made of a resilient, adhesive and heat conductive material, and is adapted to establish optimal transfer of heat generated by the wireless power receiver coil to the upper housing part.

The testing device may comprise a cable for connection to a host device. The cable may be comprised in or connected to the interface of the testing device. Beneficially, the second temperature sensor may be positioned on the cable at a distance from the housing. The first temperature sensor may thus be adapted to provide measurement data indicative of a temperature related to heat generated internally in the testing device by the wireless power receiver coil, whereas the second temperature sensor may be adapted to provide measurement data indicative of a temperature related to ambient air around the testing device.

Optionally, the thermo sensory means of the testing device further comprises a third temperature sensor being adapted to measure a temperature at a third position, wherein the third position is inside the housing and different from the first position. Advantageously, the third temperature sensor is positioned between the wireless power receiver coil and the bottom side of the housing, wherein the third temperature sensor may be adapted to provide measurement data indicative of a temperature related to heat generated by the wireless power transmitter coil of the wireless power transmitter device.

As will be apparent from the detailed description of embodiments of this invention, the testing device may be beneficially used to test, measure, evaluate, emulate or otherwise assess the thermal exposure of a mobile device when being subjected to wireless power transfer from a wireless power transmitter device having a wireless power transmitter coil, such as a wireless charger for a smartphone.

Another aspect of the present invention is a method of emulating the thermal exposure of a mobile device when being subjected to wireless power transfer from a wireless power transmitter device having a wireless power transmitter coil. According to the method, a testing device is provided which has a wireless power receiver coil matching the wireless power transmitter coil, and which has a housing with thermal absorption and dissipation properties matching a mobile device to be emulated.

According to this method, the wireless power transmitter device is operated during an operational time to generate wireless power to the testing device. A first temperature is measured at a first position inside the housing of the testing device during the operational time. Moreover, a second temperature is measured at a second position external to the housing of the testing device during the operational time.

Measurement data from the measuring of the first temperature and the second temperature during the operational time is then provided to a processing means, which may be part of a host device.

Advantageously, the processing means records the measurement data and evaluates whether the measurement data indicates a long-term deviation between the first temperature and the second temperature in excess of a threshold value during or at the end of the operational time. If so, the processing means generates an alarm signal.

Just as for the first aspect of the invention, the first position may advantageously be between the wireless power receiver coil and a top side of the housing of the testing device, wherein the measuring of the first temperature will be indicative of a temperature related to heat generated internally in the testing device by the wireless power receiver coil. Correspondingly, the second position may advantageously be at a distance from the housing of the testing device, wherein the measuring of the second temperature will be indicative of a temperature related to ambient air around the testing device.

In one embodiment, the thermal exposure testing is refined by measuring also a third temperature at a third position inside the housing of the testing device during the operational time. The third position will be different from the first position, and the measurement data provided to the processing means will include also the measuring of the third temperature.

Just as for the first aspect of the invention, the third position may advantageously be between the wireless power receiver coil and the bottom side of the housing of the testing device, and the measuring of the third temperature will be indicative of a temperature related to heat generated by the wireless power transmitter coil of the wireless power transmitter device.

Embodiments of the invention are defined by the appended dependent claims and are further explained in the detailed description section as well as on the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

Directions and orientations is three-dimensional space for the testing device as described herein are generally expressed with respect to a horizontal orientation for the testing device, corresponding to the testing device lying on a horizontal surface.

BRIEF DESCRIPTION OF THE DRAWINGS

Objects, features and advantages of embodiments of the invention will appear from the following detailed description, reference being made to the accompanying drawings.

FIG. 8 is a graph illustrating exemplary measurement data obtainable by the thermo sensory means of the testing device.

DETAILED DESCRIPTION

Figure 1:
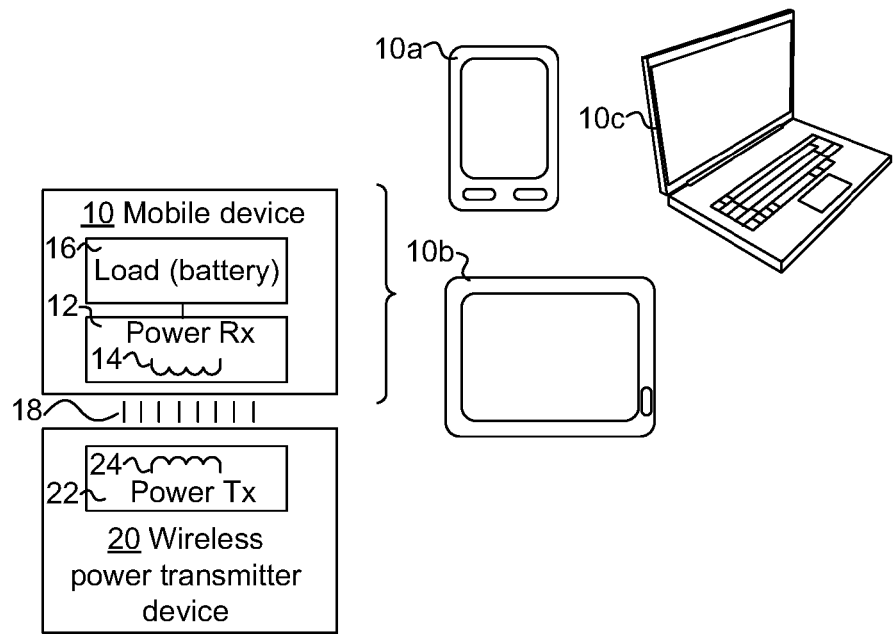
FIG. 1 is a schematic block diagram of a wireless power transmitter device for wireless power transfer to a mobile device.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates a wireless power transmitter device 20 for wireless power transfer to a mobile device 10. The mobile device may, for instance, be a mobile terminal (e.g. smartphone) 10a, tablet computer 10b (e.g. surfpad), laptop computer 10c, camera, audio player, rechargeable toothbrush, wireless headset, or another kind of consumer product or appliance.

The wireless power transfer will be described as being compliant with the Qi standard by the Wireless Power Consortium; hence, the wireless power transmitter device 20 is a base station in the Qi terminology. However, as already mentioned, the invention is generally applicable also to other wireless power transfer standards or approaches, including but not limited to the ones mentioned in the Background section.

The wireless power transmitter device 20 comprises a wireless power transmitter 22 having a wireless power transmitter coil 24. Correspondingly, the mobile device 10 comprises a wireless power receiver 12 having a wireless power receiver coil 14. In operation, the wireless power transmitter device 20 will transfer power wirelessly to the mobile device 10 by way of magnetic induction 18 via the wireless power transmitter coil 24 and wireless power receiver coil 14.

The power received by the wireless power receiver coil 14 will drive a load 16 in the mobile device 10. Typically, the load 16 may be a rechargeable battery, such as a lithium ion battery; hence, the wireless power transmitter device 20 will act as a wireless power charger for the mobile device 10. In another scenario, the load 16 may be electronic circuitry in the mobile device, wherein the wireless power transmitter device 20 will act as a wireless power supply for the mobile device 10.

As explained in the Background section, during operation, the wireless power transmitter 22 and coil 24 will generate heat that will be conveyed from the wireless power transmitter device 20 to the mobile device 10. Moreover, heat will be generated by magnetic induction in the wireless power receiver coil 14 in the mobile device 10. If the heat exposure for the mobile device 10 becomes excessive, vital components may be damaged in the mobile device, such as for instance a rechargeable battery or electronic circuitry. Also, excessive heat exposure for the mobile device may increase the risk for fire or smoke generation.

Figure 9:
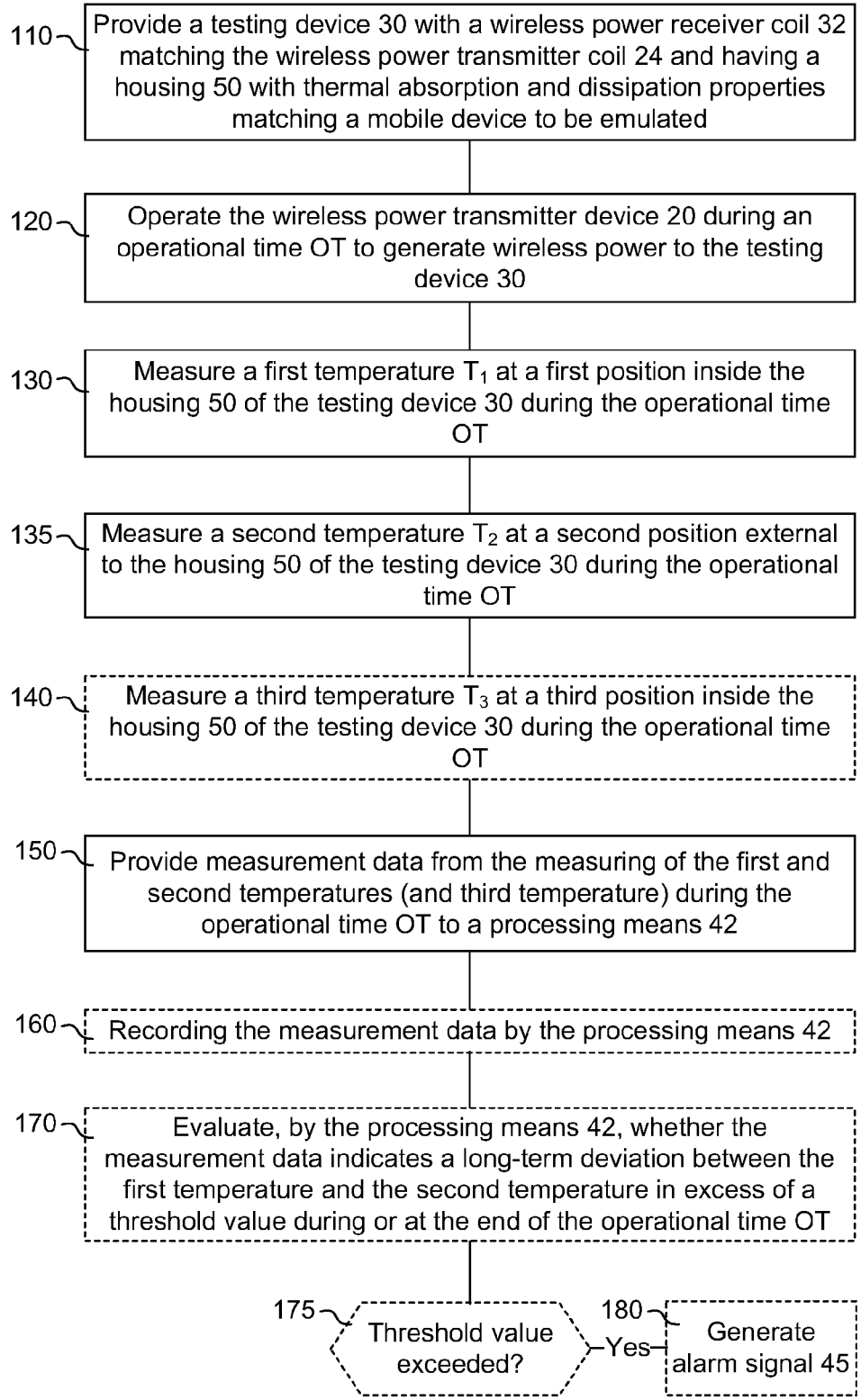
FIG. 9 is a flowchart diagram of a method of emulating the thermal exposure of a mobile device when being subjected to wireless power transfer from a wireless power transmitter device.

To this end, a testing device 30 has been provided, embodiments of which are illustrated in FIGS. 2-7. There is also provided an associated method of emulating the thermal exposure of a mobile device when being subjected to wireless power transfer from a wireless power transmitter device. This method is illustrated in FIG. 9.

Figure 2:
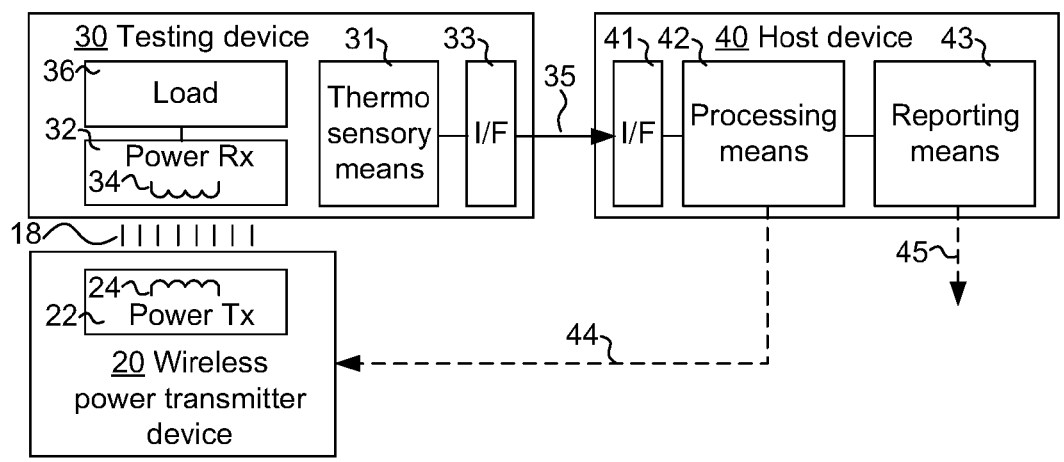
FIG. 2 is a schematic block diagram of a testing device having thermo sensory means for use with a wireless power transmitter device, and a host device for processing of measurement data provided by the testing device.

FIG. 2 is a schematic block diagram which shows a testing device 30 for use with a wireless power transmitter device 20. The wireless power transmitter device 20 has a wireless power transmitter 22 and a wireless power transmitter coil 24, and may be identical to the wireless power transmitter device 20 in FIG. 1. As will be described in more detail below, the testing device 30 has a wireless power receiver 32 with a wireless power receiver coil 34 which matches the wireless power receiver coil of a mobile device (or type of mobile device) to be emulated. Moreover, the testing device 30 has a housing with thermal absorption and dissipation properties matching the mobile device (or type of mobile device) to be emulated.

In operation, the wireless power transmitter device 20 will transfer power wirelessly to the testing device 30 by way of magnetic induction 18 via the wireless power transmitter coil 24 and wireless power receiver coil 34 during an operational time OT of a test session. As a result, heat will be generated as explained above for FIG. 1.

To measure the thermal exposure of the testing device 30 caused by the wireless power transfer from the wireless power transmitter device 20, thermal sensory means 31 are provided in the testing device 30. The thermal sensory means 31, which will be described in more detail below, will provide measurement data via an interface 33 to a host device 40, as seen at 35 in FIG. 2.

The host device 40 has an interface 41 for receiving the measurement data obtained by the thermal sensory means 31 in the testing device 30. The interfaces 33 and 41 may be of any suitable type, including simple wiring, a serial interface such as USB, a wireless interface such as Bluetooth of WiFi, etc.

The host device 40 also has processing means 42 for processing the measurement data received from the testing device 30. The processing means 42 may comprise a programmable device, such as a microcontroller, central processing unit (CPU), digital signal processor (DSP) or field-programmable gate array (FPGA) with appropriate software and/or firmware, and/or dedicated hardware such as an application-specific integrate circuit (ASIC).

Furthermore, the host device 40 has reporting means 43 for communicating or presenting the measurement processing results obtained by the processing means 42. This may involve presentation of graphical information on a local user interface (e.g. display) of the host device 40, generating of visual and/or audible alarms, or communication of information to an external device, as seen at 45.

The processing means 42 may also control and/or drive the wireless power transmitter device 20 for the purpose of the test session, as seen at 44.

A suitable load 36 may be provided to handle excess power received by the wireless power receiver coil 34 in the testing device 30. For instance, a suitably dimensioned resistor may be used.

Figure 3:
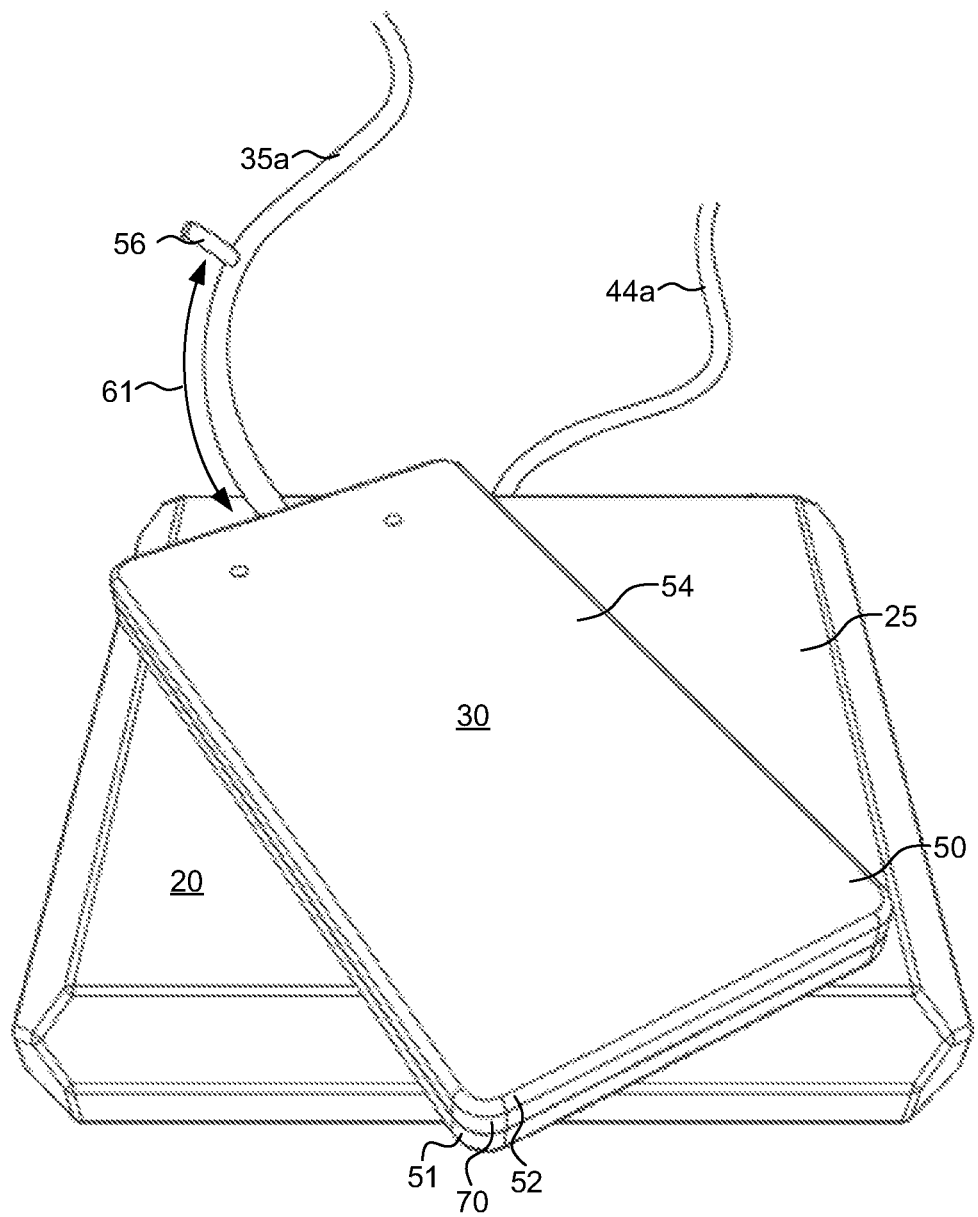
FIG. 3 is an isometric view of a testing device according to one embodiment, placed on a surface of a wireless power transmitter device.
Figure 4:
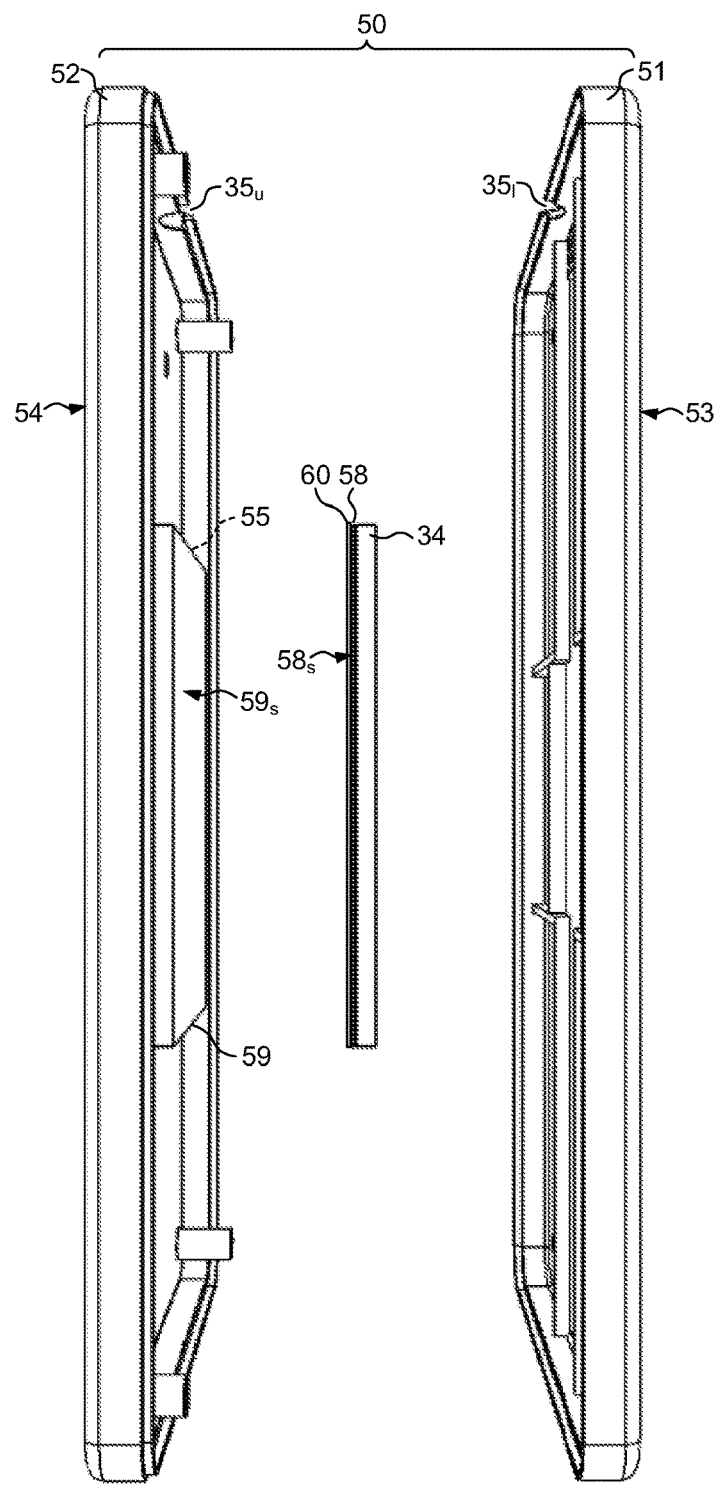
FIGS. 4 and 5 are isometric exploded views of a testing device according to one embodiment.
Figure 5:
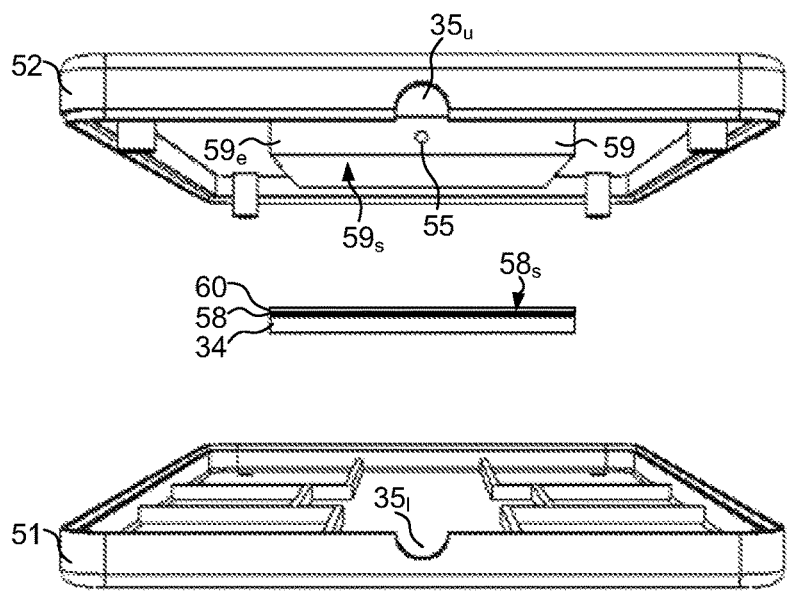
Figure 7:
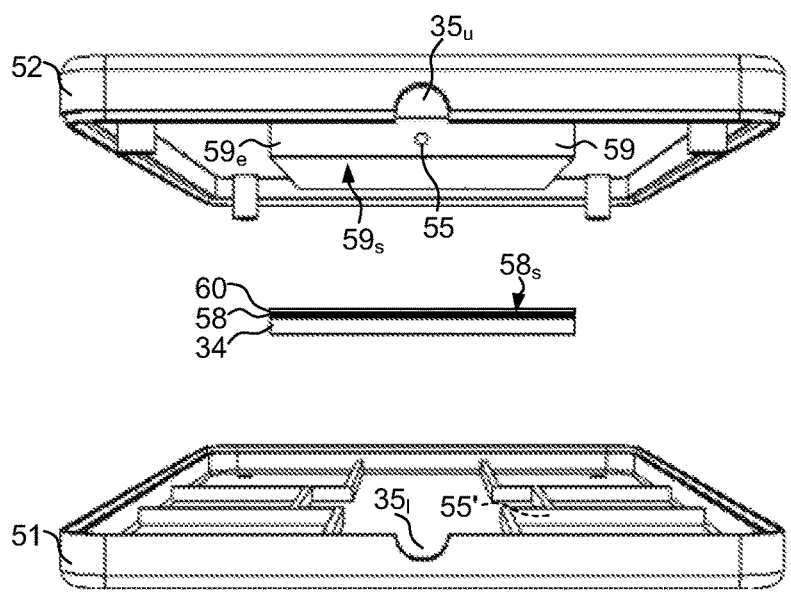
FIGS. 6 and 7 are isometric exploded views of a testing device according to another embodiment.
Figure 6:
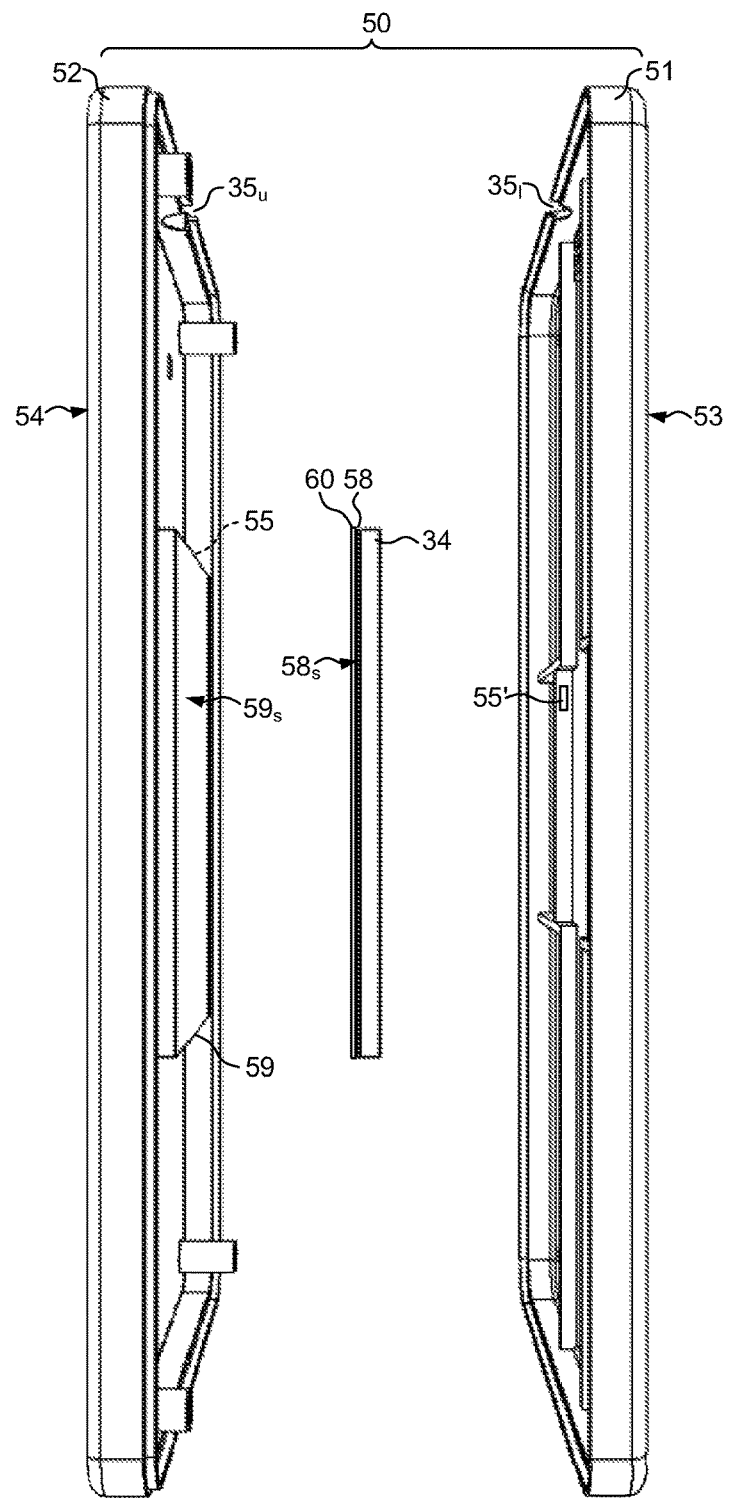

Embodiments of the testing device 30 will now be described with reference to FIGS. 3-7. FIGS. 4-5 illustrate a first embodiment, whereas FIGS. 6-7 illustrate a second embodiment which is identical to the first embodiment except for the provision of an additional element of the thermal sensory means 31. FIG. 3 is common to both embodiments. Other embodiments than the illustrated ones are possible within the scope of the invention.

As seen particularly in FIG. 3, the testing device 30 has essentially the shape of a thin box with rounded edges and corners. The disclosed embodiment serves to emulate a mobile device in the form of a smartphone; hence the testing device 30 has the familiar smartphone shape. The testing device 30 has a sandwich design with the footprint dimensions 130 mm×70 mm in the disclosed embodiment. The sandwich design includes a housing 50 having a lower housing part 51, an intermediate housing part 70 and an upper housing part 52.

The lower housing part 51 has a bottom side 53 adapted for placement on a surface 25 of the wireless power transmitter device 20. The upper housing part 52 has a top side 54 opposite to the bottom side 53. The lower housing part 51 is made of plastic or another material suitable for admitting inductive coupling 18 between the wireless power transmitter coil 24 of the wireless power transmitter device 20 and the wireless power receiver coil 34 of the wireless power receiver 32.

The intermediate housing part 70 is made of plastic or another material suitable for providing sufficient stability to the sandwich design.

The upper housing part 52 is made of a material having heat dissipation properties similar to a typical mobile device that the wireless power transmitter device 20 is designed for use with. Advantageously, the upper housing part 52 may comprise aluminium or another material with similar heat dissipation properties, such as glass, or a combination thereof.

In the disclosed embodiment of FIG. 3, the wireless power transmitter device 20 has a cable 44a, which may be connected to the host device 40, as indicated at 44 in FIG. 2. The testing device 30 has a cable 35a which may be part of the interface 33 to the host device 40, as indicated at 35 in FIG. 2.

Reference is now made to the exploded isometric views in FIGS. 4 and 5, illustrating the first embodiment of the testing device 30 as viewed from one of its longitudinal sides and one of its lateral sides, respectively. The intermediate housing part 70 has been removed from the views in FIGS. 4 and 5 (and in FIGS. 6 and 7) for enhanced clarity.

The testing device 30 has a sandwich design also internally, as appears from FIGS. 4 and 5. The wireless power receiver coil 34 is provided in the housing 50 as one of the layers of the sandwich design. Immediately above the wireless power receiver coil 34, a ferrite layer 58 for the wireless power receiver coil 34 is provided.

The interface 33 is not shown as such in FIGS. 4 and 5, but it may for instance be implemented as a small printed circuit board located within the housing 50 near an opening for the cable 35a, the opening being formed by semicircular cutouts $35_u$, $35_l$ in the upper and lower housing parts 52, 51.

A first temperature sensor 55, being part of the thermo sensory means 31, is provided above the wireless power receiver coil 34. The first temperature sensor 55 is adapted to measure a temperature at a first position inside the housing 50. More specifically, the first temperature sensor 55 is positioned between the wireless power receiver coil 34 and the top side 54 of the housing 50. Even more specifically, the first temperature sensor 55 is positioned in or at a socket 59 (a.k.a. base or pedestal) which protrudes downwardly from an inner surface of the upper housing part 52 of the housing 50.

In the illustrated embodiment, the socket 59 is an integral part of the upper housing part 52 and is therefore made of the same material as the upper housing part 52, i.e. preferably aluminium or a material with similar heat dissipation properties, such as glass. The upper housing part 52 with its socket 59 serves as a receiver or accumulator of heat generated by the wireless power receiver coil 34. The dimensions, mass and material of the upper housing part 52 with its socket 59 are hence advantageously chosen so that their combined heat dissipation properties will resemble those of a typical mobile device, such as a smartphone, for which the wireless power transmitter device 20 is designed for use with. This will enable an accurate emulation of the thermal exposure of such a typical mobile device when being subjected to wireless power transfer from. e.g. charged by, the wireless power transmitter device 20.

The socket 59 also serves as mount for the ferrite layer 58 in the illustrated embodiment. To this end, the socket 59 has a surface $59_s$ (facing downwards in the drawings) having an area which is dimensioned to match the horizontal extension of the surface $58_s$ of the ferrite layer 58 for the wireless power receiver coil 34, as can be seen in FIGS. 4-7. "Matching" means, in this context, that the area of the surface $59_s$ of the socket 59 is sufficiently large relative to the surface $58_s$ of the ferrite layer 58, so that the socket 59 may serve as a mount for the ferrite layer 58. Hence, "matching" does not require that the areas are equally large; as can be seen in FIGS. 4-7, the surface $59_s$ of the socket 59 is somewhat smaller than the surface $58_s$ of the ferrite layer 58 in these embodiments.

Advantageously, a heat transferring layer 60 is provided between the surface $59_s$ of the socket 59 and the surface $58_s$ of the ferrite layer 58. The heat transferring layer 60 will serve to establish optimal transfer of heat generated by the wireless power receiver coil 34 to the upper housing part 52 with its socket 59 and avoid any undesired isolation effects which might otherwise appear had the ferrite layer 58 abutted directly against the socket 59. Such undesired isolation effects might otherwise jeopardize the accuracy of the resemblance of the combined heat dissipation properties of the upper housing part 52 with its socket 59 with respect to a typical mobile device, since the amount of heat actually received by the upper housing part 52 with its socket 59 would be less, to an unknown extent, than the heat generated by the wireless power receiver coil 34.

The heat transferring layer 60 is preferably made of a resilient and adhesive material with good heat conducting capability, such as, for instance, silicon grease, thermal paste or thermal tape. The adhesive properties of the material may be inherent or alternatively provided by an additional adhesive. The resiliency and adhesiveness, or stickiness, of the material will facilitate the assembly of the testing device 30 by securing the heat transferring layer 60 in a correctly aligned position between and in contact with the surface $59_s$ of the socket 59 as well as the surface $58_s$ of the ferrite layer 58.

Advantageously, the first temperature sensor 55 is mounted in a bore or island in the socket 59, or in a channel or groove in the surface 59s of the socket 59. This keeps the surface $59_s$ of the socket 59 even and uninterrupted and therefore enables full contact with the heat transferring layer 60 and, as a result, optimal transfer of heat generated by the wireless power receiver coil 34 to the upper housing part 52. Also, this location of the first temperature sensor 55 is advantageous also because it is well separated and magnetically isolated from the wireless power receiver coil 34; hence, influence from magnetic fields generated from induction in the wireless power receiver coil 34 can be avoided.

In alternative embodiments, the first temperature sensor 55 may, for instance, be attached to the surface $59_s$, or to a lateral edge $59_c$ of the socket 59, by a suitable fastening means.

The thermo sensory means 31 also comprises a second temperature sensor 56. The second temperature sensor 56 is adapted to measure a temperature at a second position external to the housing 50. Hence, unlike the first temperature sensor 55, the second temperature sensor 56 is not located within the housing 50 but outside of it. The second temperature sensor 56 serves to measure an ambient temperature around the testing device 30. More specifically, in the disclosed embodiments, the second temperature sensor 56 is positioned on the cable 35a at a certain distance 61 from the housing 50. This is seen in FIG. 3. The distance is sufficient to prevent noticeable influence on the ambient temperature measurement from heat generated by the wireless power transmitter device 20 or the testing device 30. In some embodiments, a sufficient distance may be at least 150-200 mm from the housing 50.

In the disclosed embodiments, the first and second temperature sensors 55, 56 are thermocouples, such as thermocouples type K which are manufactured by Omega Engineering Limited, One Omega Drive, River Bend Technology Centre, Irlam, Manchester, M44 5BD, United Kingdom. The thermocouples generate small sensor output voltage values which are converted by an associated converter unit into a calibrated temperature value in ° C. The converter unit may, for instance, be comprised in the interface 33 or in the host device 40. In other embodiments, other types of temperature sensors may be used, such as for instance thermistors, resistance thermometers or silicon bandgap temperature sensors.

The particulars, functions and purposes of the first temperature sensor 55 and the second temperature sensor 56 will now be described.

As seen in FIGS. 4-5, the first temperature sensor 55 is positioned inside the housing 50 near or at its top side 54. The first temperature sensor 55 is adapted to provide measurement data indicative of a temperature related to heat generated internally in the testing device 30, i.e. by the magnetic induction in the wireless power receiver coil 34. This temperature will also be related to heat dissipated at the top side 54 of the housing 50 (and to some extent also to heat generated by the wireless power transmitter coil of the wireless power transmitter device 20). As a result, therefore, the first temperature sensor 55 will serve to assess the thermal environment which the internal elements of the emulated mobile device will be exposed to, as it is experienced by the testing device 30 during the operational time OT of the test session. The second temperature sensor 56, on the other hand, is positioned external to the housing 50 and is adapted to provide measurement data indicative of a temperature related to ambient air around the testing device 30. This will serve as a reference level when assessing the thermal exposure of the internal elements of the emulated mobile device.

The duration OT of the test session may be set to an appropriate maximum value which reflects a typical duration of a wireless power transfer session for the emulated mobile device, for instance 60 minutes when the emulated mobile device is a mobile terminal and the wireless power transmitter device 20 is a wireless power charger, or for instance 90 minutes, or more generally in time magnitudes between $10^1$ minutes and $10^3$ minutes, without limitation. In one embodiment, the duration OT of the wireless power transfer session may be selected or set in view of a desired or obtained temperature stabilization as indicated by the measurement data provided by the first (and/or third temperature sensor(s) 55 (55'). A criterion for temperature stabilization may then for instance be a deviation which is less than a threshold value, such as 1° C., between two or more subsequent temperature readings from the first (or third) temperature sensor 55 (55').

Exemplary graphs resulting from temperature measurements by the first and second temperature sensors 55, 56 are found in FIG. 8. The upper graph 81 represents the measurement data obtained from the first temperature sensor 55 and approaches an end temperature at about 36° C. after an operational time OT=5000 seconds. The lower graph 82 represents the measurement data obtained from the second temperature sensor 56 and ripples around an ambient air temperature at about 25° C. throughout the operational time OT=5000 seconds.

In an alternative embodiment which is seen in FIGS. 6-7, the thermo sensory means 31 further comprises a third temperature sensor 55' which is adapted to measure a temperature at a third position, Except for this, the alternative embodiment in FIGS. 6-7 may be identical to the embodiment in FIGS. 4-5. The third position is inside the housing 50 and different from the first position. In the disclosed embodiment of FIGS. 6-7, the third temperature sensor 55' is positioned between the wireless power receiver coil 34 and the bottom side 53 of the housing 50.

The third temperature sensor 55' is adapted to provide measurement data indicative of a temperature related to heat conveyed from the wireless power transmitter device 20 into the testing device 30. As a result, therefore, the third temperature sensor 55' may serve to assess the thermal environment at the bottom of the emulated mobile device, i.e. nearest the wireless power transmitter device 20, as it is experienced by the testing device 30 during the operational time OT of the test session.

The third temperature sensor 55' may be more susceptive of influence from magnetic fields generated by induction in the wireless power receiver coil 34 than the first temperature sensor 55, because of its location within the reach of the winding of the wireless power receiver coil 34. In another embodiment, therefore, a more distal (non-central) location of the third temperature sensor 55' in the lower housing part 51 may be chosen. An alternative approach is described below with reference to step 140 in FIG. 9.

The aggregated measurement data provided by the first and second temperature sensors 55, 56, and the third temperature sensor 55' if applicable, will allow the processing means 42 to make various analyses of the (emulated) thermal exposure of a mobile device when being subjected to wireless power transfer from a wireless power transmitter device. The results of such analyses may, for instance, be beneficially used by any or all of the following interest groups:

Developers, manufacturers or suppliers of mobile devices,
Developers, manufacturers or suppliers of wireless power transmitter devices,
Test or compliance entities in the field of wireless power transfer,
Test or compliance entities in the field of consumer product safety.

FIG. 9 is a flowchart diagram of a method of emulating the thermal exposure of a mobile device when being subjected to wireless power transfer from a wireless power transmitter device 20 having a wireless power transmitter coil 24. The method involves the following.

In a first step 110, a testing device is provided which has a wireless power receiver coil matching the wireless power transmitter coil 24 and which has a housing with thermal absorption and dissipation properties matching a mobile device to be emulated. The testing device may advantageously be the testing device 30 as described above for FIGS. 2-8.

In a second step 120, the wireless power transmitter device 20 is operated during an operational time OT to generate wireless power to the testing device 30. In a third step 130, a first temperature $T_1$ is measured at a first position in the testing device 30 during the operational time OT.

In a fourth step 135 a second temperature $T_2$ is measured at a second position external to the testing device 30 during the operational time OT.

In a fifth step 140, which is optional and relates to the embodiment shown in FIGS. 6 and 7, a third temperature $T_3$ is measured at a third position in the testing device 30 during the operational time OT. To avoid or reduce potential influence on the third temperature sensor 55' from magnetic fields generated by induction in the wireless power receiver coil 34, the wireless power transmitter coil 24 in the wireless power transmitter device 20 may be momentarily suspended for a short period of time when the third temperature $T_3$ is measured.

The measurements in step 130 (and 140, if applicable) will be repeated at suitable intervals during the operational time OT of the test session, such as for instance every x seconds or y minutes. The measurement in step 135 may be repeated at the same intervals, or alternatively at longer intervals, since the temperature of ambient air could be expected to remain fairly constant during the operational time OT of the test session. In some embodiments, the measurement in step 135 is only made once (e.g. at the end of the operational time OT of the test session), twice (e.g. at the beginning and the end of the operational time OT of the test session), or three times (e.g. at the beginning, in the middle and at the end of the operational time OT of the test session).

In a step 150, measurement data is provided from the measuring of the first temperature $T_1$ and the second temperature $T_2$ (and optionally the third temperature $T_3$) during the operational time OT to a processing means, for instance the processing means 42 in the host device 40 in FIG. 2.

Advantageously, the method also involves a step 160 where the processing means 42 records the measurement data received from the testing device 30, for instance by storing it in a suitable memory. Moreover, the method advantageously involves a step 170 where the processing means 42 evaluates whether the measurement data indicates a long-term deviation between the first temperature $T_1$ and the second temperature $T_2$ which exceeds a threshold value during or at the end of the operational time OT of the test session. In the diagram shown in FIG. 8, such a deviation will be the distance (in ° C.) between the first and second graphs 81 and 82 for a given period of time during or, typically, at the end of the operational time OT of the test session. The threshold value may be set to an appropriate value, such as for instance 15° C., or more generally 10-20° C. (without limitation).

If it has been found in step 170 that the internal temperature $T_1$ in the testing device 30 as measured by the first temperature sensor 55 exceeds the ambient temperature $T_2$ as measured by the second temperature sensor 56 plus the threshold value during a certain time period (e.g. a certain number of measurement samples, or a certain number of seconds), the processing means 42 will conclude in a step 175 that the testing device 30 has been exposed to an excess temperature. As a result, the processing means 42 may generate an alarm signal in a step 180. The alarm signal may be part of the information produced at 45 by the reporting means 43 in FIG. 2, or a separate signal triggering for instance a visual and/or audible alarm, or a control signal communicated to an external device as an alert of the excess temperature situation.

The method described above for FIG. 9 may have any or all of the same or functionally corresponding features as the testing device 30 described above for FIGS. 2-8. For instance, the first position is preferably between the wireless power receiver coil 34 and a top side 54 of the housing 50 of the testing device 30, and the measuring of the first temperature $T_1$ is indicative of a temperature related to heat generated internally in the testing device 30 by the wireless power receiver coil 34.

Correspondingly, the second position is preferably at a distance 61 from the housing 50 of the testing device 30, and the measuring of the second temperature $T_2$ is indicative of a temperature related to ambient air around the testing device 30.

The third position, if applicable, is preferably between the wireless power receiver coil 34 and the bottom side 53 of the housing 50 of the testing device 30, and the measuring of the third temperature $T_3$ is indicative of a temperature related to heat generated by the wireless power transmitter coil 24 of the wireless power transmitter device 20.

The invention has been described above in detail with reference to embodiments thereof. However, as is readily understood by those skilled in the art, other embodiments are equally possible within the scope of the present invention, as defined by the appended claims.

The invention claimed is:

1. A method of emulating the thermal exposure of a mobile device when being subjected to wireless power transfer from a wireless power transmitter device having a wireless power transmitter coil, the method involving:
   providing a testing device having a wireless power receiver coil matching the wireless power transmitter coil and having a housing with thermal absorption and dissipation properties matching a mobile device to be emulated;
   operating the wireless power transmitter device during an operational time to generate wireless power to the testing device;
   measuring a first temperature at a first position inside the housing of the testing device during the operational time;
   measuring a second temperature at a second position external to the housing of the testing device during the operational time; and
   providing measurement data from the measuring of the first temperature and the measuring of the second temperature during the operational time to a processing means of a host device,
   wherein the host device processes the received temperature measurement data with the processing means to obtain measurement processing results emulating the thermal exposure of a mobile device when being subjected to wireless power transfer from the wireless power transmitter device and the host device communicates or presents the obtained measurement processing results.

2. The method as defined in claim 1, further involving:
   recording the measurement data by the processing means; and
   evaluating, by the processing means, whether the measurement data indicates a long-term deviation between the first temperature and the second temperature in excess of a threshold value during or at the end of the operational time; and
   if so, generating an alarm signal.

3. The method as defined in claim 1, wherein:
   the first position is between the wireless power receiver coil and a top side of the housing of the testing device, the measuring of the first temperature being indicative of a temperature related to heat generated internally in the testing device by the wireless power receiver coil; and the second position is at a distance from the housing of the testing device, the measuring of the second temperature being indicative of a temperature related to ambient air around the testing device.

4. The method as defined in claim 3, further involving:
measuring a third temperature at a third position inside the housing of the testing device during the operational time, the third position being different from the first position, wherein the measurement data provided to the processing means includes also the measuring of the third temperature.

5. The method as defined in claim 4, wherein the third position is between the wireless power receiver coil and the bottom side of the housing of the testing device, the measuring of the third temperature being indicative of a temperature related to heat generated by the wireless power transmitter coil of the wireless power transmitter device.

6. A test system for emulating a thermal exposure of a mobile device when being subjected to wireless power transfer from a wireless power transmitter device having a wireless power coil, the test system comprising a testing device and a host device;
wherein the testing device comprises:
a housing, the housing having a bottom side adapted for placement on a surface of the wireless power transmitter device, and a top side opposite to the bottom side;
a wireless power receiver coil provided in the housing;
thermo sensory means; and
an interface to provide measurement data from the thermo sensory means to the host device for processing therein,
wherein the thermo sensory means comprises:
a first temperature sensor adapted to measure a temperature at a first position inside the housing; and
a second temperature sensor adapted to measure a temperature at a second position external to the housing;
wherein the host device comprises:
a host device interface,
processing means, and
reporting means
and wherein the host device is configured to:
receive the measurement data from the testing device by the host device interface;
process the received measurement data by the processing means to obtain measurement processing results emulating the thermal exposure of the mobile device; and
communicate or present the measurement processing results by the reporting means.

7. The test system as defined in claim 6, wherein the first temperature sensor is positioned between the wireless power receiver coil and the top side of the housing.

8. The test system as defined in claim 6, wherein the housing has a lower housing part comprising said bottom side and an upper housing part comprising said top side and wherein the upper housing part is made of a material having heat dissipation properties similar to a typical mobile device that the wireless power transmitter device is designed for use with.

9. The test system as defined in claim 8, wherein the upper housing part comprises at least one of aluminium and glass.

10. The test system as defined in claim 8, wherein the typical mobile device is a smartphone.

11. The test system as defined in claim 8, further comprising a socket which protrudes downwardly from an inner surface of the upper housing part, wherein the first temperature sensor is positioned in or at said socket.

12. The test system as defined in claim 9, wherein the testing device further comprises a socket which protrudes downwardly from an inner surface of the upper housing part, wherein the first temperature sensor is positioned in or at said socket.

13. The test system as defined in claim 12, wherein the socket is an integral part of and made of the same material as the upper housing part, the socket having a surface with an area dimensioned to match a horizontal extension of a surface of a ferrite layer for the wireless power receiver coil, the socket serving as a mount for the ferrite layer; further comprising a heat transferring layer between the surface of the socket and the surface of the ferrite layer.

14. The test system as defined in claim 13, wherein the heat transferring layer is of a resilient, adhesive and heat conductive material, and is adapted to establish optimal transfer of heat generated by the wireless power receiver coil to the upper housing part.

15. The test system as defined in claim 6, wherein the testing device further comprises a cable for connection to the host device, the cable being comprised in or connected to said interface, wherein the second temperature sensor is positioned on said cable at a distance from said housing.

16. The test system as defined in claim 6, wherein
the first temperature sensor is adapted to provide measurement data indicative of a temperature related to heat generated internally in the testing device by the wireless power receiver coil; and
the second temperature sensor is adapted to provide measurement data indicative of a temperature related to ambient air around the testing device.

17. The test system as defined in claim 16, wherein the thermo sensory means further comprises a third temperature sensor, the third temperature sensor being adapted to measure a temperature at a third position, the third position being inside the housing and different from the first position.

18. The test system as defined in claim 17, wherein the third temperature sensor is positioned between the wireless power receiver coil and the bottom side of the housing, the third temperature sensor being adapted to provide measurement data indicative of a temperature related to heat generated by the wireless power transmitter coil of the wireless power transmitter device.

19. The test system as defined in claim 6, wherein the test system is adapted for use with a wireless power transmitter device in the form of a wireless charger.

* * * * *